United States Patent
Fisher et al.

(10) Patent No.: US 7,194,732 B2
(45) Date of Patent: Mar. 20, 2007

(54) SYSTEM AND METHOD FOR FACILITATING PROFILING AN APPLICATION

(75) Inventors: Joseph A. Fisher, Miami Beach, FL (US); Giuseppe Desoli, Como (IT)

(73) Assignee: Hewlett-Packard Development Company, L.P., Houston, TX (US)

( * ) Notice: Subject to any disclaimer, the term of this patent is extended or adjusted under 35 U.S.C. 154(b) by 660 days.

(21) Appl. No.: 10/606,867

(22) Filed: Jun. 26, 2003

(65) Prior Publication Data

US 2004/0268316 A1 Dec. 30, 2004

(51) Int. Cl.
*G06F 9/44* (2006.01)
*G06F 9/45* (2006.01)

(52) U.S. Cl. .................. 717/131; 717/130; 717/153

(58) Field of Classification Search ............... 717/130, 717/131, 153
See application file for complete search history.

(56) References Cited

U.S. PATENT DOCUMENTS

| | | | |
|---|---|---|---|
| 5,768,593 A | | 6/1998 | Walters et al. |
| 5,815,720 A | * | 9/1998 | Buzbee ..................... 717/158 |
| 5,974,549 A | | 10/1999 | Golan |
| 6,164,841 A | * | 12/2000 | Mattson et al. ................ 716/1 |
| 6,178,492 B1 | * | 1/2001 | Matsuo ........................ 712/23 |
| 6,275,938 B1 | | 8/2001 | Bond et al. |
| 6,742,179 B2 | * | 5/2004 | Megiddo et al. ............ 717/130 |
| 2003/0093650 A1 | | 5/2003 | Desoli |
| 2003/0101292 A1 | | 5/2003 | Fisher et al. |
| 2003/0101330 A1 | | 5/2003 | Duesterwald et al. |
| 2003/0101334 A1 | | 5/2003 | Desoli |
| 2003/0101381 A1 | | 5/2003 | Mateev et al. |
| 2003/0101431 A1 | | 5/2003 | Duesterwald et al. |
| 2003/0101439 A1 | | 5/2003 | Desoli et al. |
| 2003/0182653 A1 | | 9/2003 | Desoli et al. |
| 2003/0192035 A1 | | 10/2003 | Duesterwald |
| 2004/0103401 A1 | * | 5/2004 | Chilimbi et al. ............ 717/130 |
| 2004/0163077 A1 | * | 8/2004 | Dimpsey et al. ............ 717/130 |

OTHER PUBLICATIONS

Ammons, Glenn et al, Exploiting Hardware Performance Counters with Flow and Context Sensitive Profiling, p. 85-86, 1997 ACM. retrieved Jun. 8, 2006.*
Bala, Vasanth et al., "Dynamo: A Transparent Dynamic Optimization System", p. 1-12, 2000 ACM, retrieved Jun. 8, 2006.*
Feng, Henry Hanping et al, "Anomaly Detection Using Call Stack Information", 2003 IEEE, retrieved Jun. 8, 2006.*
Kazi, I.H., "JaViz: A client/server Java profiling tool", IBM Systems Journal, vol. 39, No. 1, 2000, retrieved Jun. 8, 2006, google.com.*
Article entitled "Dynamo: A Transparent Dynamic Optimization System" by Bala, et al., undated, Hewett-Packard Labs, pp. 1-12.

* cited by examiner

Primary Examiner—Mary Steelman

(57) ABSTRACT

The present disclosure relates to systems and methods for facilitating profiling of applications. In one arrangement, the systems and methods pertain to intercepting application instructions; determining if an application instruction is a frequently used instruction according to a pre-established policy; and only if the application instruction is a frequently used instruction, instrumenting the application instruction so as to facilitate collection of information about execution of the application instruction.

22 Claims, 5 Drawing Sheets

SYSTEM AND METHOD FOR FACILITATING PROFILING AN APPLICATION

FIELD OF THE DISLCOSURE

This disclosure generally relates to dynamic transformation of executing binary code. More particularly, the disclosure relates to a system and method for facilitating profiling an application.

BACKGROUND OF THE DISCLOSURE

Software programmers typically profile applications during application development to determine how the various parts of the application are used during execution. With such information, execution of the application can be, for example, optimized.

Profiling typically involves collecting statistical information that reveals how the application executes. This information can include identification of which functions or parts of the application were used for a given input (i.e., coverage), the time spent executing each particular function or part, the number of times each particular function was called, the number of times each function called another function, the amount of instruction-level parallelism that is found in the executed code, etc.

The most common method used to profile applications involves statistical sampling of the application and compiler generated instrumentation. Instrumentations are inserted into the application code, typically during compilation of the source code. These instrumentations often comprise function calls that are inserted at the beginning of each application function by the compiler. Each of the instrumentations gathers information about the application function to which it is associated such that various statistical information can be obtained about the execution of each function of the application. Additionally, the caller/callee relationship between functions (or parts) for a given run with a given input is reconstructed by means of the instrumentation code inserted. This is known as the "call graph".

In addition to the information gathered by the instrumentations, the amount of time that is spent in any given application function (or part, e.g. a "basic block") typically is determined by linking the application with run-time support code that instantiates a timer that is used to periodically (e.g., 100 times per second) record the values of the application program counter. From the periodically sampled values, an approximation of the amount of time spent executing each application function can be determined.

The information collected by the various instrumentations and program counter sampling (known as a "program counter histogram") normally is analyzed by a profiling program that generates a user readable call graph, or a visual representation of it, which can be studied by the programmer to learn about the manner in which the application executes. The call graph normally comprises a series of nodes that represent the various application functions, and a series of arcs that connect the nodes and represent the various associations between the application functions. In addition, the call graph can include annotations that provide various information such as the amount of time spent within a particular application function, the number of times a function is invoked, the number of times a function invokes another function, etc.

Although the above-described method of profiling is simple to implement, it includes significant drawbacks. First, in that periodic sampling is used to collect the statistics, the results obtained may not be very accurate. Accordingly, the generated program counter histogram may contain incorrect and/or imprecise, and therefore misleading, information regarding the way in which the application executes. Although the profiling accuracy can be increased by increasing the sampling rate, the overhead associated with this increased sampling can become substantial, for instance accounting for 50% or more of the execution time.

The accuracy of the information obtained through conventional profiling methods can further be decreased due to the very fact that profiling is conducted. For example, if a function is added by the compiler to an existing application function for the purpose of collecting information about its execution, but the added function requires as much or more time to execute than the application function (e.g., if the instrumented function is very short running), the collected information will indicate more time spent in executing the existing application function than would actually be required during normal operation. Additionally, inserting instrumentation probes in a application has a non-negligible impact on various aspects of compiling and executing a given application. For example, the code generated by a compiler after the instrumentation probes have been inserted into function, may be substantially less efficient than without the instrumentations. Furthermore, at run-time the instrumentation code execution can alter the behavior of the application by altering the state of the hardware (e.g. caches, TLBs, etc.).

Profiling accuracy is further reduced when shared libraries are used by the application. As is known in the art, code from shared libraries is only accessed at application run-time. Therefore, instrumentations added to the source code by the compiler will not collect any information about the libraries' code in that this code is separate from the application source code.

Furthermore, conventional profiling methods do not permit the programmer to limit the collection of information to information concerning only those code portions that are most frequently used because such information is not known beforehand at compilation time. As is known in the art, programmers typically are not concerned about the execution of functions where the time spent executing them is so minimal as to be nearly irrelevant. However, with conventional profiling techniques, each function (or other application code portion) is individually instrumented. Another common drawback of traditional profiling schemes is that profiling is restricted to predefined statistical measures as defined by the compiler toolchain or profiling tool used. Therefore, the programmer cannot define other quantities or measures to be done on the application that may be more meaningful to the programmer for a specific application.

From the foregoing, it can be appreciated that it would be desirable to have a system and method for application profiling that avoids one or more of the drawbacks identified above.

SUMMARY

Disclosed are systems and methods for facilitating profiling of applications. In one arrangement, the systems and methods pertain to intercepting application instructions; determining if an application instruction is a frequently used instruction according to a pre-established policy; and only if the application instruction is a frequently used instruction, instrumenting the application instruction so as to facilitate collection of information about execution of the application instruction.

BRIEF DESCRIPTION OF THE DRAWINGS

The disclosed systems and methods can be better understood with reference to the following drawings.

DETAILED DESCRIPTION

Disclosed is a system and method for facilitating profiling applications. Generally speaking, the disclosed system and method can be used to gain control over execution of an application such that information can be collected as to the execution of the application code for purposes of, for example, optimizing the application. As is described in detail below, individual portions of code (e.g., basic blocks or individual instructions) can be monitored with the disclosed system and method at the binary level immediately prior to execution of the code portions. In that the code is monitored at such a low level, profiling overhead can be decreased substantially because no transformation of source code instrumentations is necessary. Furthermore, such a monitoring has a reduced impact on the profiled application code. For example, the compiler used to compile the application source code is not aware of this monitoring and its behavior is unchanged. Additionally, all executed code, including code from shared libraries, can be profiled. The disclosed system and method can also be used to limit instrumentation to only those code fragments that are most frequently executed to further reduce profiling overhead.

To facilitate description of the inventive system and method, example systems are discussed with reference to the figures. Although these systems are described in detail, it will be appreciated that they are provided for purposes of illustration only and that various modifications are feasible without departing from the inventive concept. Other example systems are described in U.S. patent application Ser. No. 09/924,260, filed Aug. 8, 2001, entitled "Dynamic Execution Layer Interface for Explicitly or Transparently Executing Application or System Binaries" which is hereby incorporated by reference into the present disclosure. After the description of the example systems, an example of operation of the systems is provided to explain the manners in which application profiling can be facilitated.

Figure 1:
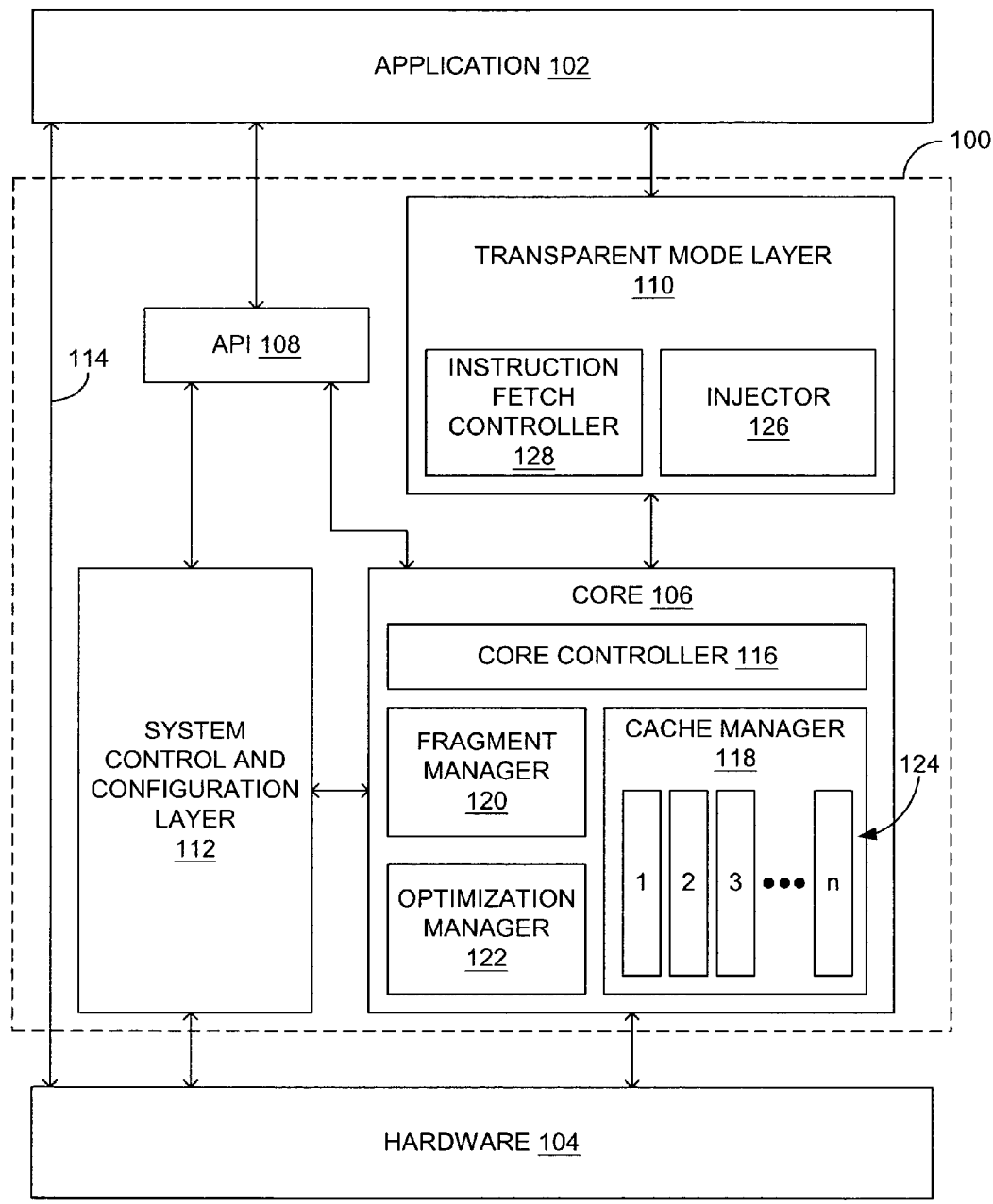
FIG. 1 is a block diagram illustrating an embodiment of a dynamic execution layer interface (DELI) executing on a computer system to provide dynamic transformation services.

Referring now to FIG. 1, illustrated is an example dynamic execution layer interface (DELI) 100 that, as identified above, can be used to facilitate application profiling. Generally speaking, the DELI 100 comprises a generic software layer written in a high or low-level language that resides between applications, including or not including an operating system (O/S), and hardware to untie application binary code from the hardware. Through this arrangement, the DELI 100 can provide dynamic computer program code transformation, caching, and linking services which can be used in a wide variety of different applications. As is discussed in greater detail below, the DELI 100 can provide its services while operating in a transparent mode, a nontransparent mode, or combinations of the two. In the transparent mode, the DELI 100 automatically takes control of an executing application in a manner in which the executing application is unaware that it is not executing directly on computer hardware. In the nontransparent mode, the DELI 100 exports its services through an application programming interface (API) to the application to allow the application to control how the DELI 100 reacts to certain system events.

In FIG. 1, the DELI 100 is shown residing between at least one application 102 and computer hardware 104. Depending upon the particular arrangement, the application 102 can comprise one or more user applications that are unaware of the DELI's presence and/or a client that is aware of the DELI 100 and which is configured to utilize the DELI's services. More generally, however, the application 102 comprises any type of program code containing instructions to be executed by a computer processor. Where an O/S is used, the DELI 100 may reside either above or below the O/S (not indicated) depending upon the nature of the services that are provided. For example, when the DELI 100 operates above the O/S, it can only control execution of applications. If the DELI 100 operates below the O/S, however, the DELI has access to an instruction stream which can include a mix of system and user code both from the O/S and applications. The hardware 104 can comprise various different computer system components but typically at least comprises a computer processor.

The DELI 100 can include four main components including a core 106, an application programming interface (API) 108, a transparent mode layer 110, and a system control and configuration layer 112. Generally speaking, the core 106 exports two main services to both the API 108 and the transparent mode layer 110. The first of these services pertains to the caching and linking of native code fragments or code fragments which correspond to the instruction set of the hardware 104. The second pertains to executing previously cached code fragments. The API 108, where provided, exports functions to the application 102 that provide access to the caching and linking services of the core 106 in the nontransparent mode of operation. The transparent mode layer 110 enables the core 106 to gain control transparently over code execution in the transparent mode of operation as well as fetch code fragments to be cached. Finally, the system control and configuration layer 112 enables configuration of the DELI 100 by providing policies for operation of the core 106 including, for example, policies for the caching, linking, and optimizing of code. These policies can, for example, be provided to the layer 112 from the application 102 via the API 108. The system control and configuration layer 112 also controls whether the transparent mode of the DELI 100 is enabled, thus determining whether the core 106 receives input from the API 108, the transparent mode layer 110, or both.

As is further indicated in FIG. 1, the system 100 can include a bypass path 114 that can be used by the application 102 to bypass the DELI 100 so that the application can execute directly on the hardware 104, where desired. It is noted that such operation can be possible in that the DELI 100 is an optional execution layer which may or may not be utilized.

As is shown in FIG. 1, the core 106 comprises a core controller 116, a cache manager 118, a fragment manager 120, and an optimization manager 122. The core controller 116 functions as a dispatcher that assigns tasks to the other components of the core 106 that are responsible for completing the tasks. The cache manager 118 comprises a mechanism (e.g., set of algorithms) that controls the caching of the code fragments within one or more code caches 124 (e.g., caches 1 through n) according to the policies specified by the system control and configuration layer 112 as well as the fragment manager 120 and the optimization manager 122. The one or more code caches 124 of the core 106 can, for instance, be located in specialized memory devices of the hardware 104, or can be created in the main local memory of the hardware. Where the code cache(s) 124 is/are mapped in specialized memory devices, greatly increased performance can be obtained due to reduced instruction cache refill overhead, increased memory bandwidth, etc. The fragment manager 120 specifies the arrangement of the code fragments within the code cache(s) 124 and the type of transformation that is imposed upon the fragments. Finally the optimization manager 122 contains the set of optimizations that can be applied to the code fragments to optimize their execution.

As noted above, the API 108, where provided, exports functions to the application 102 that provide access to DELI services. More specifically, the API 108 exports caching and linking services of the core 106 to the application 102, which typically comprises a client that is aware of the DELI's presence. These services exported by the API 108 enable the application 102 to control the operation of the DELI 100 in the nontransparent mode by (i) explicitly emitting code fragments to the core 106 for caching and/or by (ii) instructing the DELI 100 to execute specific code fragments out of its code cache(s) 124. In addition, the API 108 also can export functions that initialize and discontinue operation of the DELI 100. For instance, the API 108 can initiate transparent operation of the DELI 100 and further indicate when the DELI is to cease such operation. The API 108 also, as mentioned above, facilitates configuration of the DELI 100 by delivering policies specified by the application 102 to the core 106 (e.g., to the fragment manager 120 and/or the optimization manager 122).

With further reference to FIG. 1, the transparent mode layer 110 typically includes an injector 126 which is used to gain control over a running application 102 transparently. When the DELI 100 operates in a completely transparent mode (i.e., where the application is unaware of the DELI's presence) the injector 126 is used to inject the DELI into the application 102 before the application begins execution so that the application can be run under DELI control. In such circumstances, the DELI 100 avoids modifying the application's 102 executable image to avoid impeding exception handling. Control can be gained by the injector 126 in several different ways, each of which loads the application binaries without changing the virtual address at which the binaries are loaded. By way of example, the O/S kernel loader can be modified such that the DELI 100 (e.g., compiled as a shared library) is automatically loaded by the kernel loader when it loads the application's executable image. Alternatively, a user level loader can be used to leverage the kernel loader without modifying it to load the application 102 in memory in suspended mode and later inject instructions into the application (e.g., on the application stack) that will load the DELI 100 shared library later when the application is resumed.

In another alternative, ptrace can be used to attach the DELI 100 to the application 102. As is known in the art, ptrace is a mechanism often used by debuggers that allows one process to control another. The DELI 100 can be configured as a separate process that attaches to the application 102 via ptrace, and runs the application until the point where the execution start-up code at the top of the application's binary image (e.g., crt0) is about to call the application's entry point. Execution of the application 102 can then be suspended, and the DELI 100 can be used to fetch the application instructions and execute them on its behalf.

In yet another alternative, the application's text segment can be expanded in a separate copy of the executable file. In particular, the application's binary image can be copied to a temporary location, the application's text segment extended by adding a DELI text segment at the end, and the start symbol (i.e., the entry point that is called by crt0) changed to the DELI entry point. The resulting executable file can then be executed using exec. The original application's text segment is still loaded at the same virtual address that it would normally have, but the DELI 100 will gain control before the actual application 102 starts.

In another example, the DELI 100 can gain control over the application 102 using a special version of crt0. As is known in the art, the crt0 code is responsible for picking-up the command line arguments, setting up the initial stack and data segment, and then making a call to the value of the start symbol (usually the main( ) function of the application 102). Prior to calling the application 102 entry point, crt0 maps the dynamic link loader dld, which then loads any dynamically linked libraries (DLLs) referenced by the application 102. A custom version of crt0 can be used to additionally map the DELI code (itself compiled as a DLL), and call the DELI's entry point instead of the one defined by the start symbol.

Irrespective of the manner in which control is obtained over the application 102, an instruction fetch controller 128 can then be used to extract (i.e., fetch) copies of fragments (e.g., traces) of the application binary code, pass them to the DELI core 106 for caching, and direct the core 106 to execute the appropriate cached copies out of its code cache(s) 124. Use of the transparent mode layer 110 in facilitating such operation is described below in relation to FIG. 4.

It is to be noted that, although the DELI 100 has been shown and described herein as including the API 108, persons having ordinary skill in the art will appreciate from this disclosure taken as a whole that the API may be omitted altogether depending upon the mode of operation that is desired. For instance, where the DELI 100 is to only operate in a completely transparent mode, the API 108 may not be necessary.

As noted above, the system control and configuration layer 112 enables configuration of the DELI 100 by providing policies for the caching and linking of code. Although the DELI 100 is not limited to any particular type of policy or policy content, the policies typically determine how the DELI will behave. For instance, the layer 112 may provide policies as to how fragments of code are extracted from the application 102, how fragments are created from the original code, how multiple code fragments can be linked together to form larger code fragments, etc. The layer's policies can be static or dynamic. In the former case, the policies can be hardcoded into the DELI 100, fixing the configuration at build time. In the latter case, the policies can be dynamically provided by the application 102 through function calls in the API 108. Implementation of the policies controls the manner in which the DELI 100 reacts to specific system and/or hardware events (e.g., exceptions and interrupts). In addition to the policies noted above, the system control and configuration layer 112 can specify the size of the code cache(s) 124, whether a log file is created, whether code fragments should be optimized, etc.

Figure 2:
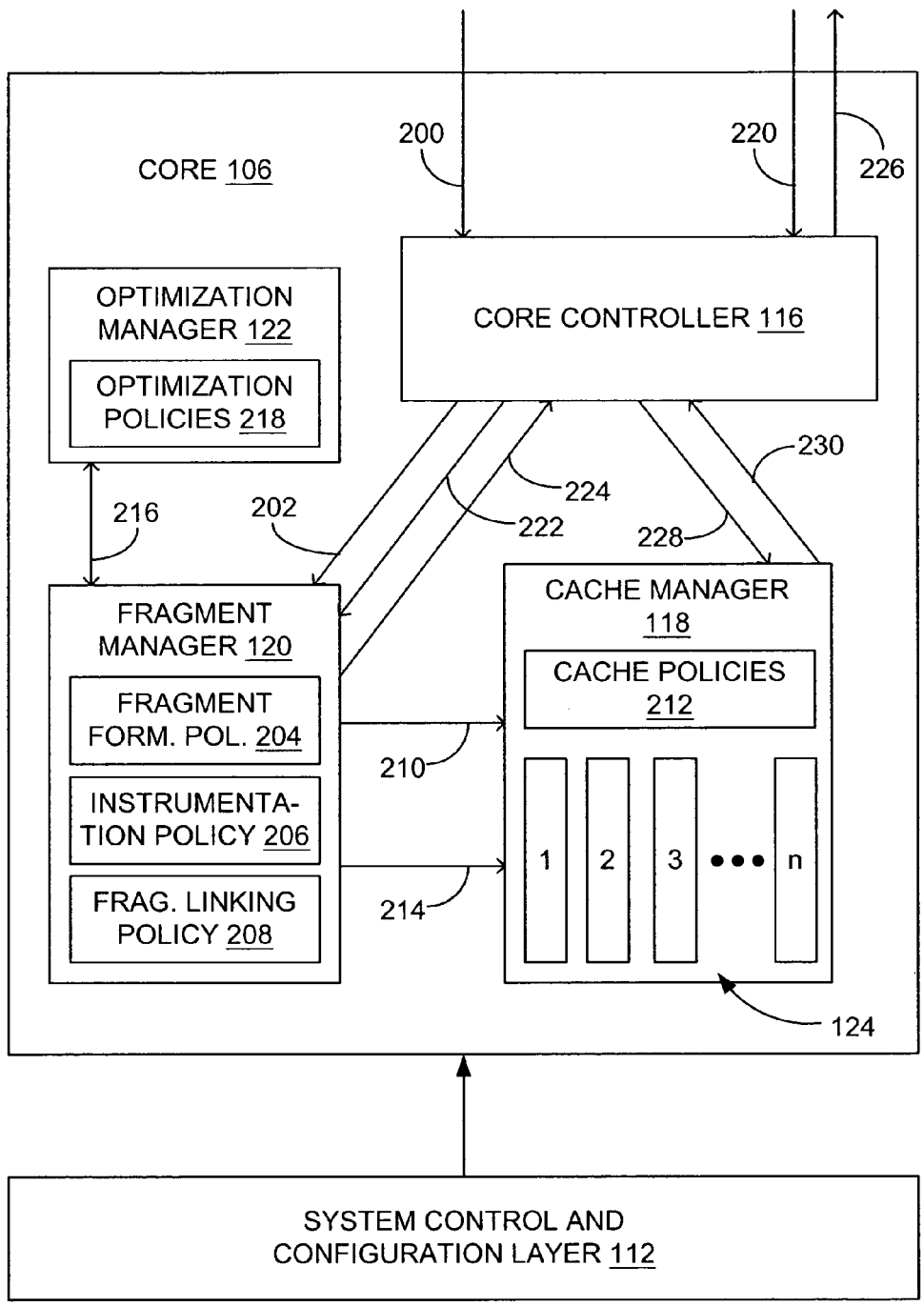
FIG. 2 is a block diagram of an embodiment of a configuration and operation of a core of the DELI shown in FIG. 1.

FIG. 2 illustrates an example configuration of the core 106 and its operation. As indicated in this figure, the core 106 accepts two types of requests from the API 108 or the transparent mode layer 110. First, requests 200 can be accepted for caching and linking a code fragment through a function interface. Such a request can comprise a function in the form of, for instance, "DELI_emit_fragment(tag, fragbuf)". This function receives a code fragment as its parameters and an identifier (e.g., tag) to store in the DELI cache(s) 124. In addition, the core 106 accepts requests for initiating execution at a specific code fragment tag through a function interface such as "DELI_execute_fragment(tag)", which identifies a code fragment stored in the cache(s) 124 to pass to the hardware 104 for execution.

The core controller 116 processes these requests and dispatches them to the appropriate core module. A request 202 to emit a code fragment with a given identifier can then be passed to the fragment manager 120. The fragment manager 120 transforms the code fragment according to its fragment formation policy 204, possibly instruments the code fragment according to its instrumentation policy 206, and links the code fragment together with previously cached fragments according to its fragment linking policy 208. For example, the fragment manager 120 may link multiple code fragments in the cache(s) 124, so that execution jumps to another code fragment at the end of executing a code fragment, thereby increasing the length of execution from the cache(s). To accomplish this, the fragment manager 120 issues fragment allocation instructions 210 to the cache manager 118. The fragment manager 120 then sends a request to the cache manager 118 to allocate the processed code fragment in the code cache(s) 124.

The cache manager 118 controls the allocation of the code fragments and typically is equipped with its own cache policies 212 for managing the cache space. However, the fragment manager 120 may also issue specific fragment deallocation instructions 214 to the cache manager 118. For example, the fragment manager 120 may decide to integrate the current fragment with a previously allocated fragment, in which case the previous fragment may need to be deallocated. In some arrangements, the cache manager 118 and fragment manager 120 can manage the code cache(s) 124 and code fragments in the manner shown and described in U.S. Pat. No. 6,237,065, issued May 22, 2001, entitled "A Preemptive Replacement Strategy for a Caching Dynamic Translator Based on Changes in the Translation Rate," which is hereby incorporated by reference into the present disclosure. Alternatively, management of the code cache(s) 124 and code fragments may be performed in the manner shown and described in U.S. patent application Ser. No. 09/755,389, filed Jan. 5, 2001, entitled "A Partitioned Code Cache Organization to Exploit Program Locality," which is also hereby incorporated by reference into the present disclosure.

Prior to passing a fragment to the cache manager 118, the fragment manager 120 may pass (216) the fragment to the optimization manager 122 to improve the quality of the code fragment according to its optimization policies 218. In some arrangements, the optimization manager 122 may optimize code fragments in the manner shown and described in U.S. patent application Ser. No. 09/755,381, filed Jan. 5, 2001, entitled "A Fast Runtime Scheme for Removing Dead Code Across Linked Fragments," which is hereby incorporated by reference into the present disclosure. Alternatively, the optimization manager 122 may optimize code fragments in the manner shown and described in U.S. patent application Ser. No. 09/755,774, filed Jan. 5, 2001, entitled "A Memory Disambiguation Scheme for Partially Redundant Load Removal," which is also hereby incorporated by reference into the present disclosure. Notably, the optimization manager 122 may also optimize code fragments using classical compiler optimization techniques, such as elimination of redundant computations, elimination of redundant memory accesses, inlining functions to remove procedure call/return overhead, etc. In the case of using the DELI 100 for profiling an application, however, it is foreseen that the code fragments will not be optimized in order to gather the desired code statistics and measures.

As mentioned above, the fragment manager 120 transforms the code fragment according to its fragment formation policy 204. The transformations performed by the fragment manager 120 can include code relocation by, for instance, changing memory address references by modifying relative addresses, branch addresses, etc. The layout of code fragments may also be modified, changing the physical layout of the code without changing its functionality (i.e., semantics). These transformations are performed by the fragment manager 120 on fragments received through the API 108 and from the instruction fetch controller 128.

To perform code instrumentation, the fragment manager 120 gathers data according to the instrumentation policy 206 for code profiling, such as data on the frequency of execution of code fragments, the frequency with which a memory address is accessed, etc. Program counters can be used to collect these statistics in order to facilitate fragment formation or deallocation. These policies are configured by the system control and configuration layer 112, which receives policy instructions sent either through the API 108 or established at DELI build time. The policies may comprise options for different ways to create, instrument, optimize, and link fragments, or the policies may simply be hardcoded algorithms in the DELI 100 for performing these tasks.

The second type of request accepted by the DELI core 106 is a request 220 to execute a fragment identified by a given identifier (e.g., tag). In such a case, the core controller 116 issues a lookup request 222 to the fragment manager 120, which returns a corresponding code cache address 224 if the fragment is currently resident and active in the cache(s) 124. By way of example, the fragment manager 120 can maintain a lookup table of resident and active code fragments in which a tag can be used to identify the location of a code fragment. Alternatively, the fragment manager 120 or cache manager 118 can use any other suitable technique for tracking whether code fragments are resident and active. If the fragment is not currently resident and active in the cache(s) 124, the fragment manager 120 returns an error code to the core controller 116, which returns (226) the fragment tag back to the initial requester as a cache miss address. If, on the other hand, the fragment is currently resident and active, the core controller 116 then patches (228) the initial request to the cache manager 118 along with its cache address. The cache manager 118, in turn, transfers control to the addressed code fragment in its code cache(s) 124, thus executing the addressed code fragment. Execution then remains focused in the code cache(s) 124 until a cache miss occurs, i.e., until a copy for the next application address to be executed is not currently resident in the cache(s). This condition can be detected, for instance, by an attempt of the code being executed to escape from the code chache(s) 124.

A cache miss is reported (230) from the cache manager 118 to the core controller 116 and, in turn, back (226) to the initial requester.

Figure 3:
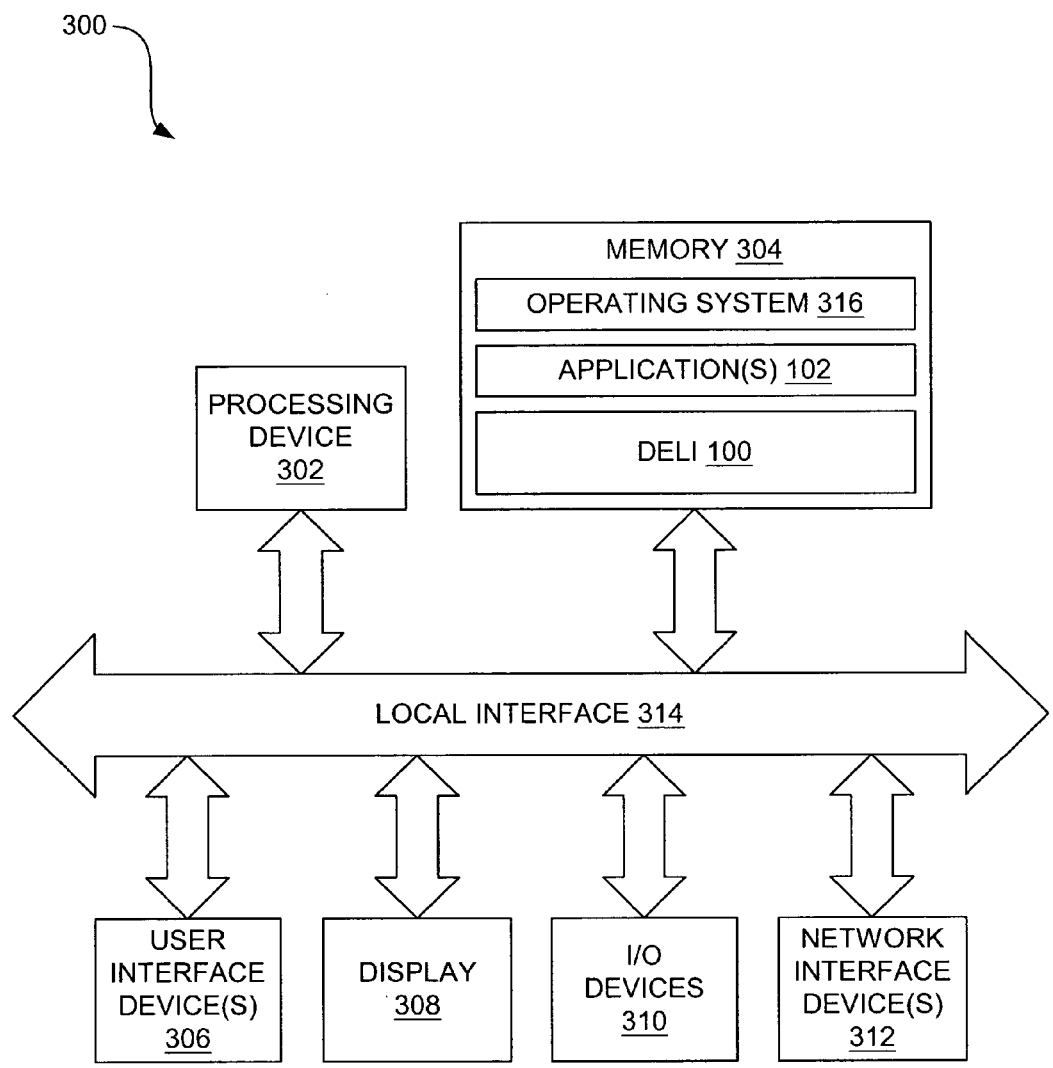
FIG. 3 is a block diagram of an embodiment of a computer system on which the DELI shown in FIG. 1 can be executed.

FIG. 3 is a schematic view illustrating an example architecture for a computer system 300, e.g., a multiprogrammed system, on which the DELI 100 can execute. Generally speaking, the computer system 300 can comprise any one of a wide variety of wired and/or wireless computing devices, such as a desktop computer, portable computer, dedicated server computer, multi-processor computing device, and so forth. Irrespective its specific arrangement, the computer system 300 can, for instance, comprise a processing device 302, memory 304, one or more user interface devices 306, a display 308, one or more input/output (I/O) devices 310, and one or more networking devices 312, each of which is connected to a local interface 314.

The processing device 302 can include any custom made or commercially available processor, a central processing unit (CPU) or an auxiliary processor among several processors associated with the computer system 300, a semiconductor based microprocessor (in the form of a microchip), a macroprocessor, one or more application-specific integrated circuits (ASICs), a plurality of suitably configured digital logic gates, and other well known electrical configurations comprising discrete elements both individually and in various combinations to coordinate the overall operation of the computing system.

The memory 304 can include any one of a combination of volatile memory elements (e.g., random access memory (RAM, such as DRAM, SRAM, etc.)) and nonvolatile memory elements (e.g., ROM, hard drive, tape, CDROM, etc.). The memory 304 typically comprises an O/S 316, one or more applications 102 (e.g., user application and/or client), and the DELI 100, which has already been described in detail. Persons having ordinary skill in the art will appreciate that the memory 304 can, and typically will, comprise other components which have been omitted for purposes of brevity.

The one or more user interface devices 306 comprise those components with which the user can interact with the computing system 300. For example, where the computing system 300 comprises a personal computer (PC), these components can comprise a keyboard and mouse. Where the computing system 300 comprises a handheld device (e.g., PDA, mobile telephone), these components can comprise function keys or buttons, a touch-sensitive screen, a stylus, etc. The display 308 can comprise a computer monitor or plasma screen for a PC or a liquid crystal display (LCD) for a handheld device.

With further reference to FIG. 3, the one or more I/O devices 310 are adapted to facilitate connection of the computing system 300 to another system and/or device and may therefore include one or more serial, parallel, small computer system interface (SCSI), universal serial bus (USB), IEEE 1394 (e.g., Firewire™), and/or personal area network (PAN) components. The network interface devices 312 comprise the various components used to transmit and/or receive data over a network. By way of example, the network interface devices 312 include a device that can communicate both inputs and outputs, for instance, a modulator/demodulator (e.g., modem), wireless (e.g., radio frequency (RF)) transceiver, a telephonic interface, a bridge, a router, network card, etc.

Various software and/or firmware has been described herein. It is to be understood that this software and/or firmware can be stored on any computer-readable medium for use by or in connection with any computer-related system or method. In the context of this document, a computer-readable medium denotes an electronic, magnetic, optical, or other physical device or means that can contain or store a computer program for use by or in connection with a computer-related system or method. These programs can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device.

The computer-readable medium can be, for example but not limited to, an electronic, magnetic, optical, electromagnetic, infrared, or semiconductor system, apparatus, device, or propagation medium. More specific examples (a nonexhaustive list) of the computer-readable medium include an electrical connection having one or more wires, a portable computer diskette, a random access memory (RAM), a read-only memory (ROM), an erasable programmable read-only memory (EPROM, EEPROM, or Flash memory), an optical fiber, and a portable compact disc read-only memory (CDROM). Note that the computer-readable medium can even be paper or another suitable medium upon which a program is printed, as the program can be electronically captured, via for instance optical scanning of the paper or other medium, then compiled, interpreted or otherwise processed in a suitable manner if necessary, and then stored in a computer memory.

Figure 4:
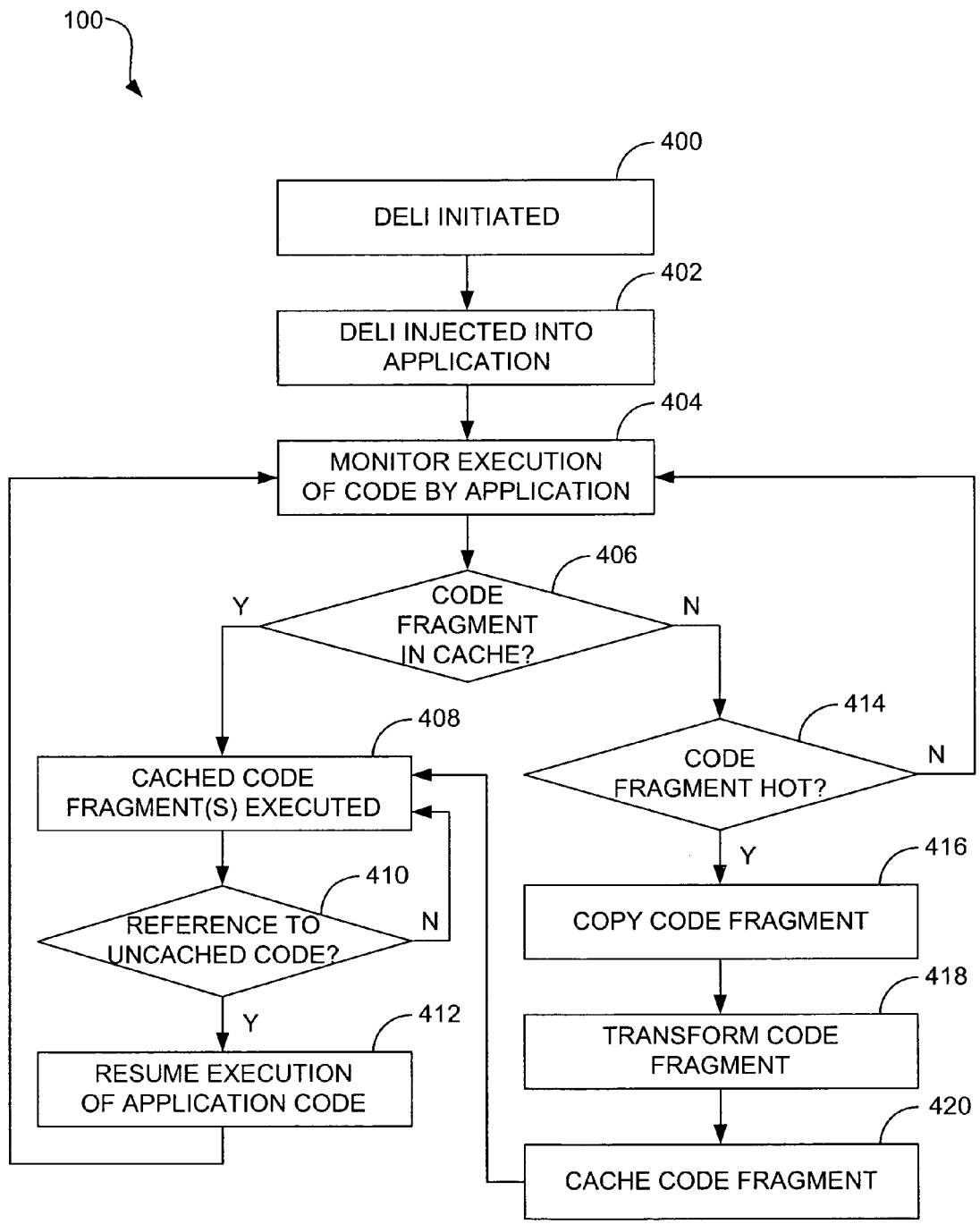
FIG. 4 is a flow diagram that illustrates an embodiment of transparent operation of the DELI shown in FIG. 1.

The general nature of the DELI 100 having been described above, an example of operation of the DELI will now be discussed. As identified above, the DELI 100 operates in two general operating modes, i.e., a transparent mode and a nontransparent mode, as well as combinations thereof. FIG. 4 illustrates operation in the transparent mode. In describing this mode of operation, a flow diagram is provided. It is to be understood that any process steps or blocks in flow diagrams of this disclosure represent modules, segments, or portions of code that include one or more executable instructions for implementing specific logical functions or steps in the process. It will be appreciated that, although particular example process steps are described, alternative implementations are feasible. Moreover, steps may be executed out of order from that shown or discussed, including substantially concurrently or in reverse order, depending on the functionality involved.

Generally speaking, irrespective of whether the DELI 100 has gained control over the execution of the application 102 transparently or nontransparently, the application does not execute directly on the hardware 104. Rather, application code executes through the DELI 100, for instance, in the form of code fragments that may be maintained in the code cache(s) 124. FIG. 4 illustrates a simple example of the DELI 100 operating in a completely transparent mode in which the application 102 is unaware of the DELI's presence. Beginning with block 400, the DELI 100 is first initiated. When operating in the transparent mode, this initiation can result from initiation of the application 102. Upon its initiation, the DELI 100 is injected into the application 102 with the injector 126 of the transparent mode layer 110, as indicated in block 402, such that the DELI gains control over the application and its execution. As noted above, there are various different methods in which this control can be gained.

Once the DELI 100 has control over the application 102, the DELI can be used to provide any one of several different services such as those noted above. For instance, the DELI 100 can facilitate hardware and/or software emulation, dynamic translation and optimization, transparent remote code execution, remapping of computer system functionality for virtualized hardware environments program, code decompression, code decryption, etc. These different services each involve the caching and the linking of program code fragments within the code cache(s) 124. By caching certain fragments of code copied from the application binaries and transforming them in some manner, the desired services can be provided by later executing the transformed code from the code cache(s) 124.

Before caching code, the DELI 100 must determine which particular fragments of code to cache. In that, when operating in the completely transparent mode, the application 102 is unaware of the DELI 100, the DELI does not receive guidance from the application as to which code fragments to cache. Although the caching of code can be dictated through the policies created at the DELI build time, more typically, the DELI 100 will, at least in part, make these determinations on its own. The DELI 100 can do this by monitoring the execution of application code, as indicated in block 404. In so doing, the DELI 100 can collect information as to, for instance, which code fragments are most useful to the application 102 by, for example, determining which fragments are most frequently used.

As the various code fragments are executed by the application 102 under the control of the DELI 100, the DELI "sees" each piece of code that is executed. Through the monitoring process, the DELI 100 can, therefore, determine which code fragments are used most frequently. The DELI 100 can then make the determination of which pieces of code are "hot," i.e., most important to application execution with reference to the policies that are provided by the system control and configuration layer 112. As noted above, this determination can be made using program counters that track execution instances. Persons having ordinary skill in the art will appreciate that various other methods can be used to make the determination of which pieces of code are hot. Examples of the manner in which this determination can be made are described in U.S. patent application Ser. No. 09/186,945, filed Nov. 5, 1998, entitled "Method for Selecting Active Code Traces for Translation in a Caching Dynamic Translator," and U.S. patent application Ser. No. 09/312,296, filed May 14, 1999, entitled "Low Overhead Speculative Selection of Hot Traces in a Caching Dynamic Translator," both of which are hereby incorporated by reference into the present disclosure.

With further reference to FIG. 4, as each code fragment is executed, the DELI 100 can determine whether an associated code fragment has previously been cached, as indicated in decision element 406. If so, the DELI 100 jumps to the code cache(s) 124 that contains the cached (and potentially transformed) code and this code is executed by the hardware 104 in lieu of the original application code, as indicated in block 408. The determination of whether the code has been cached can be made with reference to, as noted above, identifiers (e.g., tags) that identify the association between native application code and analogues that have been cached within the code cache(s) 124. Execution of the cached code then continues, including the execution of linked fragments of code that reside in the code cache(s) 124, until such time when a reference to code that has not been cached (i.e., a cache miss) is encountered. With reference to decision element 410, if a reference to uncached code is encountered, the DELI 100 jumps back to the application code and the execution of that code is resumed, as indicated in block 412. At this time, the DELI 100 can resume monitoring of this execution (block 404).

Returning to decision element 406, if the DELI 100 determines that an associated code fragment does not reside in the code cache(s) 124, flow continues to decision element 414 at which it is determined whether the code fragment is hot with reference to a predetermined policy. If the code is not hot, flow returns to block 404 at which monitoring of the application code execution continues. If, on the other hand, the code is hot, the code fragment is copied, as indicated in block 416, by fetching the fragment using the instruction fetch controller 128 of the transparent mode layer 110. It is noted that, if desired, each piece of code can be copied prior to determining whether the code is hot in decision element 414. Such a change does not, however, affect the overall operation of the system 100 or the results that can be achieved.

At this point, the code fragment can be transformed in some manner, as indicated in block 418. In addition, code fragments within the cache(s) 124 can be linked according to the policies that have been established for code linking. The nature of the code transformation depends upon the type of services that the DELI 100 is to provide. For example, where the DELI 100 is to merely optimize the application execution, this transformation can comprise rearranging and/or reconfiguring the code for better performance. Irrespective of the nature of the transformation provided, the code structure is modified in a way without modifying the underlying semantics. Once the code fragment has been transformed, the transformed code can be cached within the code cache(s) 124, as indicated in block 420, and executed within the DELI 100 with flow continuing to block 408 described above.

Although, in the above example, code is cached when it is considered hot, other criteria may be used to determine which pieces of code to cache. Indeed, in some arrangements, each piece of code (or at least an associated version of the code) may be cached so that substantially all execution ultimately occurs within the code cache(s) 124.

As noted above, the DELI 100 may also operate in a nontransparent mode. Generally speaking, when operating in the nontransparent mode, the DELI 100 may operate, for example, as a DLL or a statically linked module which exports functions in the API 108 that the application 102 can access. In the simplest case, the application (client) controls every aspect of DELI operation through the API 108. In such a case, the DELI 100 can be utilized to cache, link, and optimize code according to explicit instructions provided by the client via the API 108. Alternatively, in a hybrid arrangement, the client may call upon the DELI 100 to provide its services in a transparent manner. In such a case, the client invokes operation of the DELI 100, as well as provides instructions as to when the DELI is to halt its operation. In either case, the client is aware of the DELI 100 and is configured to utilize the DELI's services. In that, in the profiling scenario, the application 102 normally is not aware of the DELI's presence, the nontransparent mode of operation is not described in detail. Persons having ordinary skill in the art will appreciate, however, that such profiling could be provided in a nontransparent manner where the application software is written to facilitate or initiate such profiling.

As described above, most existing profiling methods are disadvantageous from the standpoint of profiling accuracy and overhead. These problems can be in large part avoided, however, when the DELI 100 is used in that the DELI controls low level code (e.g., application binaries) at runtime. Therefore, the DELI 100 can monitor the execution of each application function, basic block, or individual instruction to obtain information about the execution of the application code. In addition, with the DELI's ability to determine when code fragments are hot, the DELI 100 can be used to limit instrumentation only those portions of code that are most frequently used, thereby reducing profiling overhead.

Figure 5:
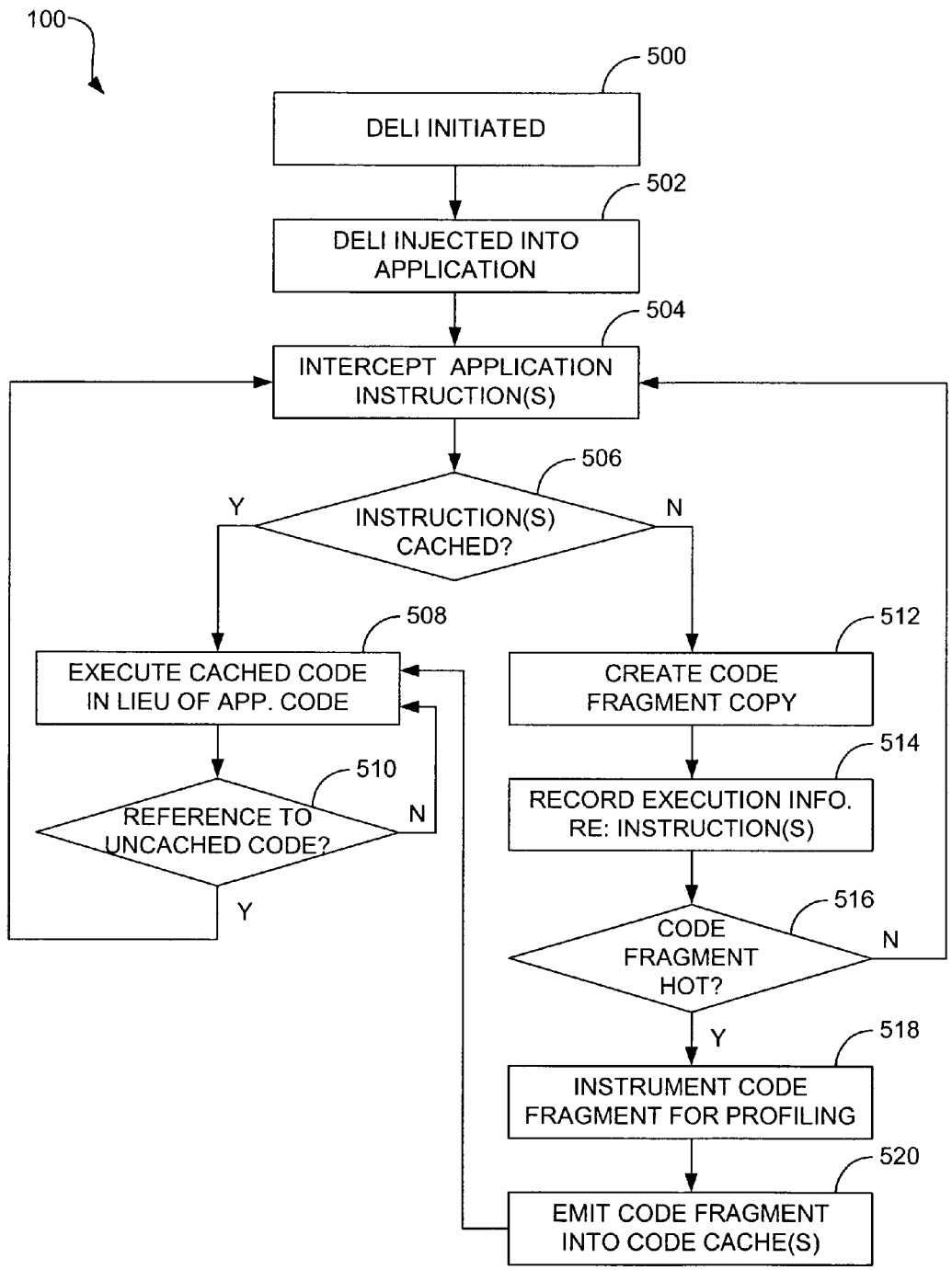
FIG. 5 is a flow diagram that illustrates an embodiment of operation of the DELI shown in FIG. 1 in profiling an application.

An example of DELI operation in facilitating the profiling of an application is shown in FIG. 5. Beginning with block 500, the DELI 100 is initiated and, as indicated in block 502, injected into the application 102 before it starts so as to gain control over its execution. As in the mode of operation described in relation to FIG. 4, the DELI 100 monitors the execution of code to determine which code fragments to cache and therefore intercepts application instructions, as indicated in block 504. Accordingly, the DELI 100 can first determine whether an associated code fragment has previously been cached, as indicated in decision element 506. If so, the DELI 100 jumps to the code cache(s) 124 that contain the code and this code is executed by the hardware 104 in lieu of the original application code, as indicated in block 508. Again, execution of the cached code continues until a reference to code that has not been cached is encountered (510), e.g., a cache miss occurs, at which time the DELI 100 jumps back to the application code and block 504.

With reference back to decision element 508, if no associated code fragment resides in the code cache(s) 124, flow continues to block 512 at which a code fragment (one or more application instructions) is copied, for instance to one or more instruction buffers. The DELI 100 can then record information concerning execution of the code fragment, as indicated in block 514. By way of example, this information can include the fact that the code fragment was executed (one iteration), what instruction(s) called the code fragment, which instruction(s) the code fragment calls, etc. Notably, unlike as with conventional profiling methods, information is also gathered regarding the execution of instructions (e.g., routines) contained within any shared libraries that the application accesses. Normally, the various collected information is placed in a file that will be used by a suitable profiling program to generate a call graph that reveals information about the manner in which the application executes. In addition, application coverage can be determined from the collected information so as to provide the programmer with an indication of which pieces of code are implicated for any given input.

Next, with reference to decision element 516, the DELI 100 determines whether the code fragment is hot in the manner described in relation to FIG. 4. If the code fragment is not hot, flow simply returns to block 504 at which the DELI 100 continues to intercept application instructions. If, on the other hand, the code fragment is hot, i.e., the fragment is a frequently used code fragment as determined by a pre-established policy, flow continues to block 518 at which the code fragment is instrumented for profiling. This instrumentation is necessary in that, as is apparent from the flow of FIG. 5, the DELI 100 does not explicitly monitor code execution within the code cache(s) 124.

The code fragment can be instrumented so as to collect a variety of information. Again, this information can comprise the fact that the code fragment was executed, what instruction(s) called the code fragment, what instruction(s) the fragment calls, etc. In addition, the code fragment can be instrumented to increment a cycle counter (not shown) that is maintained by the DELI 100 to approximate the number of processor cycles required to thereby execute the code fragment to estimate the time spent executing the fragment during application operation. The magnitude of the increment is dictated by the DELI's estimate as to how many processor cycles are required to execute the fragment. For instance, the instrumentation could increment the relevant counter by 40 cycles each time the code fragment is executed where the DELI 100 has estimated that 40 processor cycles are needed to execute the fragment. By way of example, the number of cycles can be estimated by the DELI 100 by counting the number of instructions and their theoretical latency of execution in terms of cycles as specified for the given architecture in the architecture specification manuals. Although useful, this method has the drawback of neglecting contributions to the cycle counts due to dynamic events such as instruction and data cache stalls or a cache mechanism used for efficient cache operations misses and refills. Another method of estimation that does not have this drawback is based on the availability of a hardware counter that could be set up by the DELI 100 and polled by the DELI-inserted instrumentation code at the beginning and end of a fragment to derive the number of cycles needed to execute it. Separate counters can be used for each code fragment so that information can be collected regarding execution of each individual fragment. In addition, a global counter can be provided that reflects the execution time of all cached code fragments.

With the collected cycle information, an estimate of time spent in executing each code fragment can be determined as long as the processor speed is known or, in the case a hardware counter is used, the counter frequency. This information can then be included within the call graph (or other output) generated by the profiling program. Although the addition of the instrumentations to the cached code fragments add overhead to application execution, the amount of this overhead is significantly less than that added in conventional profiling methods in that instrumentations are inserted in the form of low-level instructions that have minimal impact on the code. Once the code fragment has been instrumented, it is emitted into the code cache(s) 124, as indicated in block 520, and flow returns to block 508 described above.

The methods described above do not prevent the use of statistical sampling as an alternative method to profiling the code even when the hot fragments are executed in the code cache in that the DELI 100 can make a determination as to which original application code is associated with the code in the code cache and produce the correct statistical output for the original code. Inserting instrumentation at run-time also enables user defined quantities to be accumulated for code fragments or functions and/or gives more control to the user over what is being monitored with a much finer level of control than traditional profiling schemes. For example the user may require filtering of part of the call graph so that the output of the profiling is not cluttered with irrelevant information Most utilities used to display profiling information to programmers allow this as a post pass on the profiling data The advantage of the disclosed approach is that the overhead of event collecting it is removed.

Another example of an alternative quantity that can be profiled, but which often proves difficult to measure, is the amount of instruction level parallelism (ILP). Such a quantity represents the average number of elementary operations (e.g., such as those completed by reduced instruction set computers (RISCs)), executed in parallel per cycle by the processor, to run a given program or application. Such a quantity bears a great importance to analyze program performance for certain kinds of microprocessors such as very long instruction word (VLIW) or superscalar, and in general any processor that exploits instruction level parallelism.

To measure ILP (sometimes expressed in terms of cycles per instructions (CPI), or instructions per cycle (IPC)), a profile scheme can be implemented based on the mechanism described above. The only additional requirement in this case, is that, in addition to execution cycles, the profiler accumulates the number of VLIW (or parallel) instructions being executed for each code fragment as previously described. At the end of the execution, the accumulated cycles and number of instructions can be used to produce the desired quantities (ILP or IPC) per each code block or fragment, in addition to the global program average values, by dividing the number of cycles by the number of instructions executed to calculate CPI, or by dividing the total instructions executed by the number of cycles for IPC.

Accumulating the number of instructions executed for a code fragment is an easy task for statically scheduled VLIW, because the parallel instructions are generated at compile time and their structure is no longer altered during execution. The DELI process of emitting fragments into the code cache is an ideal place to count those VLIW instructions. For a superscalar processor however, an additional complication arises from the fact that parallel instructions are formed dynamically while the program is running. This requires an additional phase during fragment emission to estimate how many instructions the superscalar CPU would be executing in parallel. Once this is estimated, that information is used to emit the profiling instrumentation code as previously described. For superscalars, this approach leads to less precise measurements.

While particular embodiments of the invention have been disclosed in detail in the foregoing description and drawings for purposes of example, it will be understood by those skilled in the art that variations and modifications thereof can be made without departing from the scope of the invention.

The invention claimed is:

1. A method for facilitating profiling of an application, comprising:
   intercepting an application instruction immediately before its execution;
   determining if code associated with the intercepted application instruction has already been stored in a code cache of an interface layer;
   if associated code has been stored in the code cache, executing the associated code from the code cache in lieu of the intercepted application instruction;
   if the associated code has not already been stored in the code cache, determining if the application instruction is a frequently used instruction according to a pre-established policy;
   only if the application instruction is a frequently used instruction, instrumenting the application instruction so as to facilitate collection of information about execution of the application instruction; and
   storing the instrumented application instruction in the code cache such that it will be executed in lieu of the intercepted application instruction when the application instruction is intercepted again.

2. The method of claim 1, wherein the intercepted application instruction is an application binary.

3. The method of claim 1, wherein determining if an application instruction is a frequently used instruction comprises consulting a program counter associated with the application instruction.

4. The method of claim 1, wherein instrumenting the application instruction comprises instrumenting the application instruction to collect information as to the fact that the application instruction was executed.

5. The method of claim 1, wherein instrumenting the application instruction comprises instrumenting the application instruction to collect information as to what other application instruction called the intercepted application instruction.

6. The method of claim 1, wherein instrumenting the application instruction comprises instrumenting the application instruction to collect information as to what application instructions the intercepted application instruction calls.

7. The method of claim 1, wherein instrumenting the application instruction comprises instrumenting the application instruction to increment a counter representing a number of processor cycles required to execute the application instruction.

8. The method of claim 1, further comprising recording information as to the execution of the intercepted application instruction.

9. The method of claim 8, wherein recording information comprises recording information as to the execution of code stored in a shared library that the application accesses.

10. A system for facilitating profiling of an application, comprising:
   means for intercepting application instructions before they are executed;
   means for determining if code associated with intercepted application instructions has already been stored in a code cache of an interface layer;
   means for executing the associated code from the code cache in lieu of the intercepted application instructions;
   means for determining if application instructions are used frequently;
   means for instrumenting frequently used application instructions to facilitate collection of information about execution of the application instructions; and
   means for storing the instrumented application instructions in the code cache such that they will be executed in lieu of the intercepted application instructions when the application instructions are intercepted again.

11. The system of claim 10, wherein the means for determining if applications instructions are frequently used instructions comprise means for counting the number of times the application instructions are executed.

12. The system of claim 10, wherein the means for instrumenting the application instructions comprise means for instrumenting the application instructions to collect information as to at least one of the fact that the application instructions were executed, what other application instructions called the intercepted application instructions and other application instructions the intercepted application instructions call.

13. The system of claim 10, wherein the means for instrumenting the application instructions comprise means for instrumenting the application instructions to increment a counter representing a number of processor cycles required to execute the application instructions.

14. The system of claim 10, further comprising means for recording information as to the execution of the intercepted application instructions.

15. A program that facilitates profiling of an application and that is stored on a computer-readable memory medium, the program comprising:

logic configured to intercept application binaries;

logic configured to determine if code associated with intercepted application binaries has already been stored in a code cache of an interface layer;

logic configured to execute the associated code from the code cache in lieu of the intercepted application binaries;

logic configured to determine if applications instructions are frequently used instructions;

logic configured to instrument the application instructions that are determined to be frequently used instructions so as to facilitate collection of information about execution of the application instruction; and logic configured to store the instrumented application instructions in the code cache such that they will be executed in lieu of the intercepted application instructions when the application instructions are intercepted again.

16. The program of claim 15, wherein the logic configured to determine if application instructions are frequently used instructions comprises logic configured to count the number of times the application instructions are executed.

17. The program of claim 15, wherein the logic configured to instrument the application instructions comprises logic configured to instrument the application instructions to collect information as to at least one of the fact that the application instructions were executed, what other application instructions called the intercepted application instructions and other application instructions the intercepted applications instruction call.

18. The program of claim 15, wherein the logic configured to instrument the application instructions comprises logic configured to instrument the application instructions to increment a counter representing a number of processor cycles.

19. The program of claim 15, further comprising logic configured to record information as to the execution of the intercepted application instructions required to execute the application instructions.

20. A method for facilitating profiling of an application, comprising:

intercepting application code fragments prior to their execution;

determining if code associated with the fragments has already been stored in a code cache of an interface layer;

executing the associated code from the code cache in lieu of the intercepted code fragments if associated code has been each stored;

determining how many very long instruction words (VLIWs) are executed for each cached code fragment;

instrumenting the application code fragments if they are determined to be frequently executed fragments; and storing the instrumented application code fragments in the code cache such that they will be executed in lieu of the intercepted application code fragments when the application code fragments are intercepted again.

21. The method of claim 20, wherein instrumenting the code fragments comprises instrumenting the fragments to collect information as to the fact that the fragments were executed.

22. The method of claim 20, wherein instrumenting the code fragments comprises instrumenting the fragments to increment a counter representing a number of processor cycles.

* * * * *

UNITED STATES PATENT AND TRADEMARK OFFICE
CERTIFICATE OF CORRECTION

PATENT NO. : 7,194,732 B2  Page 1 of 1
APPLICATION NO. : 10/606867
DATED : March 20, 2007
INVENTOR(S) : Joseph A. Fisher et al.

It is certified that error appears in the above-identified patent and that said Letters Patent is hereby corrected as shown below:

In column 16, line 45, in Claim 11, delete "applications" and insert -- application --, therefor.

In column 16, line 53, in Claim 12, delete "instructions" and insert -- instructions, --, therefor.

In column 17, line 8, in Claim 15, delete "applications" and insert -- application --, therefor.

In column 17, lines 28-29, in Claim 17, delete "instructions" and insert -- instructions, --, therefor.

In column 18, line 16, in Claim 20, after "been" delete "each".

Signed and Sealed this

Third Day of February, 2009

JOHN DOLL
*Acting Director of the United States Patent and Trademark Office*